Figure 1:
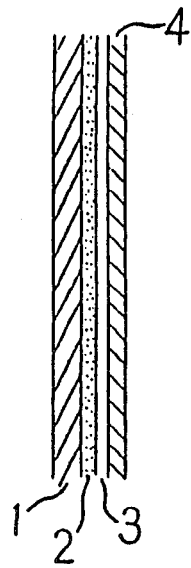

United States Patent [19]

Watanabe et al.

[11] Patent Number: 4,484,967

[45] Date of Patent: Nov. 27, 1984

[54] METHOD FOR BONDING DIFFERENT KINDS OF METALS

[75] Inventors: Yoshikazu Watanabe; Toshihide Tsukahara; Shozo Ota, all of Nagasaki, Japan

[73] Assignee: Mitsubishi Jukogyo Kabushiki Kaisha, Tokyo, Japan

[21] Appl. No.: 489,413

[22] Filed: Apr. 26, 1983

[30] Foreign Application Priority Data

May 7, 1982 [JP] Japan .................................. 57-75091

[51] Int. Cl.$^3$ ............................................. B32B 31/12
[52] U.S. Cl. .................................... 156/151; 156/310; 156/330; 156/332; 428/325
[58] Field of Search ................. 156/60, 182, 310, 314, 156/325, 151, 330, 332; 428/325, 458, 433, 461; 106/14.34, 14.39, 288 B; 114/356, 67 R; 252/389.3, 396; 427/208.8, 409

[56] References Cited

U.S. PATENT DOCUMENTS

| | | | |
|---|---|---|---|
| 2,671,736 | 3/1954 | Zoeller | 106/14.34 |
| 3,175,937 | 3/1965 | Bayer | 156/89 |
| 3,855,044 | 12/1974 | Riel | 161/89 |
| 3,884,705 | 5/1975 | Blair | 106/1 |
| 4,022,649 | 5/1977 | Nakagome et al. | 156/309 |
| 4,169,006 | 9/1979 | Matsubara et al. | 156/315 |
| 4,330,587 | 5/1982 | Woodbrey | 428/215 |

OTHER PUBLICATIONS

Hearn, Ronald C., *Anti-Corrosion*, Aug. 1978, pp. 7-9.

*Primary Examiner*—Robert Dawson
*Attorney, Agent, or Firm*—Wenderoth, Lind & Ponack

[57] ABSTRACT

In the case where two kinds of metals are to be bonded while maintaining an electrically insulated condition therebetween, one of the metals to be bonded is applied with a paint containing glass flakes which serves as an insulating material and then the painted surface of the one metal is bonded to the other metal with a binder.

6 Claims, 4 Drawing Figures

METHOD FOR BONDING DIFFERENT KINDS OF METALS

The present invention relates to a method for bonding different kinds of metals in a ship or other structures to be used in the sea or in water, and more particularly to a method for bonding such different kinds of metals while maintaining an electrically insulated condition therebetween in order to protect them from electrolytic corrosion.

What is to be paid of attention in the bonding of different kinds of metals with each other, is to maintain an electrically insulated condition between the different kinds of metals. More particularly, if a given metallic material bonded with another metallic material is immersed in the sea, then in the event that material electrode potentials (hereinafter abbreviated as potentials) are different, a metal having a lower potential is corroded by an electrolytic corrosion effect. Accordingly, in the case where a bonded portion between different kinds of metallic materials is in the sea, it is important to electrically insulate the different kinds of metallic materials from each other for the purpose of preventing elution of either metallic material from being quickly accelerated.

Heretofore, as a method for maintaining electrical insulation a number of methods have been known, but they have shortcomings respectively, and they are not reliable with respect to bonding of a large area, durability over a long period, etc. Now, description will be made on these methods in the prior art and their shortcomings.

1. A method in which a binder to be used upon bonding is made to have an insulative nature:

This method is effective in the case where an area to be bonded is small and bonding force is also not required to be so large. The reasons exist in that while binders are generally classified into a liquid state binder and a film state binder, the both types of binders necessitate to be press-bonded upon bonding (so that no clearance may be formed between one metal and the other metal to be bonded), and that a binding force of a binder is generally enhanced as it is made thinner (aggregation breakdown of a binder is made to occur scarcely by making it thinner). More particularly, since the binder is painted thin and press-bonded, the larger the bonding area is, the higher becomes the probability of one metal to be bonded being partly brought into contact with the other metal to be bonded, and hence this method is not suitable for bonding a large area. In addition, in the event that foreign matters adhere to or welding beads remain on the bonding surface of either metal to be bonded or the bonding surface is not finished flat, then the respective metals to be bonded may be possible brought into indirect or direct contact with each other, and so, there is fear that the insulation therebetween may become poor.

2. A method in which an insulative paint is preliminarily applied onto the bonding surface of either one metal to be bonded:

This method is effective in the case where the surfaces of the one or both metals to be bonded are smooth and have no unevenness. However, in the case where the metal to be bonded is, for instance, a welded structure, adhesion of sparking particles produced upon welding onto the surface of the structure as by sputtering as well as unevenness of the surface caused by contact with another structure during transportation of the materials, will result in loss of the effect of the insulative paint. In order to overcome this shortcoming, it is necessary to thicken the film thickness of the paint or to finish the surface of the metal to be bonded flat. However, normally the film thickness of the paint is in many cases several 10 $\mu$m, and in order to obtain a film thickness thicker than this, it is necessary that after a paint applied has once hardened, again or again and again repeatedly painting is effected several times, so that this method has a shortcoming that a working period is prolonged and more labor is necessitated. In addition, to finish the surface of the metal to be bonded flat would result in increase of the amount of work and hence enhancement of a cost, in the case where the metal to be bonded has a large area as is the case with an outer plate of a hull.

3. A method in which a solid-state insulator such as, for instance, a rubber sheet is sandwiched between the different kinds of metals:

This method is a reliable method as the method for maintaining electrical insulation between different kinds of metals. However, it has a shortcoming that since bonding works at two portions, that is, between one metal to be bonded and the insulator and between the insulator and the other metal to be bonded are involved, a cost is raised.

It is therefore one object of the present invention to provide a method for bonding different kinds of metals, which has a low bonding cost and which can maintain a bonding force and electrical insulation therebetween over a long period of time.

According to one feature of the present invention, there is provided a method for bonding different kinds of metals while maintaining an electrically insulated condition therebetween, in which a paint containing glass flakes is used as an insulating material.

Figure 2:
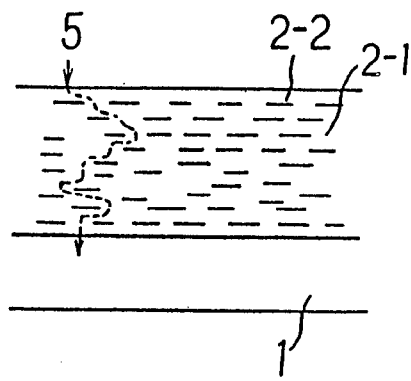
Figure 3:
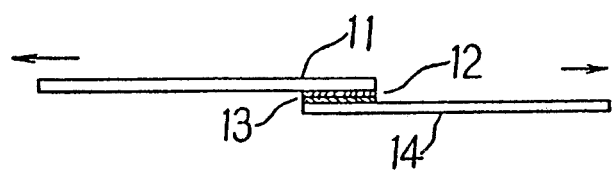
Figure 4:
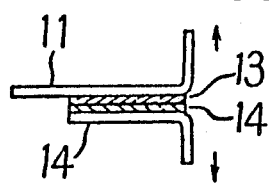

The above-mentioned and other features and objects of the present invention will become more apparent by reference to the following description of preferred embodiments of the invention taken in conjunction with the accompanying drawings, wherein:

FIG. 1 is a schematic view showing one preferred embodiment of the present invention, FIG. 2 is an enlarged view of a part of FIG. 1, and FIGS. 3 and 4, respectively, are schematic views showing constructions of test pieces employed in two different examples of test experiments of the present invention.

Referring now to FIG. 1, an insulative paint 2 is applied to a metal 1 to be bonded as by spraying. As shown in FIG. 2, this paint 2 consists of a principal agent 2-1 and glass flakes 2-2 mixed in the former. The glass flakes 2-2 have the following two effects. One is the effect that thixotropy is generated in the paint and hence a thick film can be obtained through once of painting. In other words, the glass flakes 2-2 can suppress sagging of the paint when it is applied. The other is the effect that in the case where water 5 is going to enter from the surface of the painted film as shown in FIG. 2, the water would not advance straightly before it reaches the surface of the metal 1 to be bonded but instead it could reach the surface through the path shown by a dotted line in FIG. 2, and this means that the paint containing glass flakes can protect the surface of the metal 1 to be bonded from water over a long period of time.

On the above-mentioned insulative paint 2 is applied a bonding metal 4 by means of a binder 3.

It is to be noted that modification could be made such that the above-mentioned insulative paint has been preliminarily applied to the other metal 4 to be bonded and then this is applied to the metal 1 to be bonded by the intermediary of a binder.

Now, the bonding force obtained in the case of practicing the method according to the present invention will be confirmed by reference to examples of test experiments of the invention.

Example of test experiments 1:

A test piece having the construction shown in FIG. 3 was prepared.

In FIG. 3, reference numeral 11 designates a steel plate of 1.6 mm in thickness, numeral 12 designates an insulative paint layer formed by employing a paint containing glass flakes and principally consisting of polyester resin of vinyl ester series or a paint containing glass flakes and principally consisting of polyester resin of isophthalic acid series (the above paints are both commercially available in the market as a heavy anti-corrosion material for a steel plate in the sea water), numeral 13 designates a binder layer formed by employing a binder of acrylic series, and numeral 14 designates a copper plate of 0.5 mm in thickness (two kinds of copper plates were used, one having its surface Ni-plated, the other having its surface painted with an organic primer).

Tensile shearing force tests were conducted by making use of the aforementioned test piece. The directions of loading are shown by arrows in FIG. 3. The results of the test experiments were as indicated in Table-1.

TABLE 1

| Surface Treatment of Copper Plates | Test No. | Tensile Shearing Force Tests Insulative Paint | | | |
|---|---|---|---|---|---|
| | | A | | B | |
| | | Tensile Shearing Force | Sheared State | Tensile Shearing Force | Sheared State |
| a | 1 | 101.6 kg/cm$^2$ | Cutting of Copper Plate | 78.2 kg/cm$^2$ | Aggregation Breakdown of Binder |
| | 2 | 98.8 kg/cm$^2$ | Cutting of Copper Plate | 52.3 kg/cm$^2$ | Aggregation Breakdown of Binder |
| | 3 | 102.0 kg/cm$^2$ | Aggregation Breakdown of Binder | 63.0 kg/cm$^2$ | Aggregation Breakdown of Binder |
| b | 1 | 64.8 kg/cm$^2$ | Breakdown on the Surface of Copper Plate | 58.7 kg/cm$^2$ | Breakdown on the Surface of Copper Plate |
| | 2 | 64.0 kg/cm$^2$ | Breakdown on the Surface of Copper Plate | 59.2 kg/cm$^2$ | Breakdown on the Surface of Copper Plate |
| | 3 | 62.9 kg/cm$^2$ | Breakdown on the Surface of Copper Plate | 53.3 kg/cm$^2$ | Aggregation Breakdown of Binder | a: Ni—plated copper plate
b: Copper plate painted with an organic primer
A: Paint principally consisting of polyester resin of vinyl ester series
B: Paint principally consisting of polyester resin of isophthalic acid series Example of test experiments 2:

A test piece having the construction shown in FIG. 4 was prepared.

Reference numerals in FIG. 4 designate equivalent component parts to those designated by like reference numerals in FIG. 3.

Tearing bonding force tests were conducted by making use of the aforementioned test piece. The directions of loading are as shown by arrows in FIG. 4. The results of the test experiments were as indicated in Table-2.

TABLE 2

| Surface Treatment of Copper Plates | Test No. | Tearing Bonding Force Tests Insulative Paint | | | |
|---|---|---|---|---|---|
| | | A | | B | |
| | | Tear-off Strength | Tear-off State | Tear-off Strength | Tear-off State |
| a | 1 | 17.5 kg/cm$^2$ | Aggregation Breakdown of Binder | 10.1 kg/cm$^2$ | Aggregation Breakdown of Insulative Paint |
| | 2 | 19.1 kg/cm$^2$ | Aggregation Breakdown of Binder | 12.2 kg/cm$^2$ | Aggregation Breakdown of Insulative Paint |
| | 3 | 17.5 kg/cm$^2$ | Aggregation Breakdown of Binder and Breakdown on the Surface of | 16.8 kg/cm$^2$ | Aggregation Breakdown of Binder |

TABLE 2-continued

| Surface Treatment of Copper Plates | Test No. | Tearing Bonding Force Tests Insulative Paint | | | |
|---|---|---|---|---|---|
| | | A | | B | |
| | | Tear-off Strength | Tear-off State | Tear-off Strength | Tear-off State |
| b | 1 | 14.1 kg/cm$^2$ | Copper Plate Breakdown on the Surface of Copper Plate | 15.7 kg/cm$^2$ | Aggregation Breakdown of Binder |
| | 2 | 11.9 kg/cm$^2$ | Breakdown on the Surface of Copper Plate | 10.3 kg/cm$^2$ | Aggregation Breakdown of Insulative Paint and Aggregation Breakdown of Binder |
| | 3 | 11.1 kg/cm$^2$ | Breakdown on the Surface of Copper Plate | 10.4 kg/cm$^2$ | Aggregation Breakdown of Insulative Paint and Aggregation Breakdown of Binder | a, b, A, B denote the same items as Table 1.

From the Examples of Test Experiments 1 and 2 above, the following facts would become obvious.

According to the tensile shearing force tests in the Example of Test Experiments 1, every test piece has a tensile shearing strength of 52.3 kg/cm$^2$ or higher, and as it is seen that the obtained bonding force is sufficient as a bonding force for a structure necessitating electrical insulation such as a ship and the like. This is a considerably high bonding strength as compared to the bonding strength of an oily paint, a bituminous paint or the like generally used for rust proofing purpose which is equal to 5~20 kg/cm$^2$.

In addition, according to the tearing bonding force tests in the Example of Test Experiments 2, every test piece has a tear-off strength which is equal to 10.1 kg/cm$^2$ or higher even in the worst case, and so it is seen that the test pieces have a remarkably high strength as compared with the strength of an oily paint, a bituminous paint or the like which is equal to 0.5~2 kg/cm$^2$.

Moreover, besides the insulative paints A and B used in the Examples of Test Experiments 1 and 2 above, other paints containing glass flakes which principally consist of polyester resin of bisphenol series, epoxy series resin or modified epoxy series resin provided results of test experiments presenting values approximately close to those given in Tables-1 and 2, and it has been proved that they are also excellent as an insulative paint to be used upon bonding different kinds of metals. These paints are excellent in an electrical insulation property in that their volume specific resistance is $1~3 \times 10^{14}$ Ω-cm (at an applied voltage of 1000 V), moreover a film thickness of 500~700 μm can be obtained through once of painting work, furthermore spray painting is also possible, reliable insulation as well as a cheap work for a large area can be realized, these paints are excellent in protection of the surface of a base member in the sea over a long period of time, and it has been proved that from a general point of view these paints (and the bonding method) are remarkably more advantageous than other insulating materials (insulating method) as an insulating material (insulating method) for bonding different kinds of metals in the case of using the bonded metals in the sea.

The effects of the present invention as described above are summarized as follows:

1. As compared to normal painting, thicker painting is possible even if the body to be bonded is a vertical wall-like body because a paint containing glass flakes is used, and so, reliable insulation can be secured (upon painting work, sagging of a paint would not occur).

2. Since painting is employed, the process of working is simple.

3. Since a paint containing glass flakes is employed, invasion of the sea water seldom occurs, and so, for the purpose of protecting the surface of the bonded body in the sea water, the method according to the present invention is more excellent than other methods.

4. A paint containing glass flakes has a strong bonding force and a sufficient durability against a binder and other chemicals, and therefore, it is most suitable as an insulating material to be used in the sea over a long period of time.

What is claimed is:

1. A method for bonding two dissimilar metals by means of an insulating material to avoid electrolytic corrosion between the metals when used in water or sea water, which method comprises applying a thermosetting paint containing glass flakes therein to one or both of the surfaces of a first and second metallic material to be bonded together to form an insulating paint film on the surface or surfaces of the two different metals; applying a binder onto the surface or surfaces of said insulating film and/or onto the surface of said metal surface in the case in which an insulating film is not formed, and bringing said first and second metals together in tight contact with each other so that the insulating layer and binder are sandwiched inbetween the first and second metal materials so as to form an electrically insulated bonded layer therebetween.

2. A method according to claim 1 in which said first metallic material is a steel plate and the second metallic material consists of a copper plate.

3. A method according to claim 1 in which the surface of said copper plate to be bonded is subjected to surface treatment by plating the copper with nickel or applying an organic primer on the surface thereof prior to bonding the steel plate to the copper plate through said insulating paint film.

4. A method according to claim 1 in which the paint containing said glass flakes is selected from the group consisting of polyester resins, epoxy resins or modified epoxy resins.

5. A method according to claim 4 in which the paint is sprayed onto the metal.

6. A product produced by the method of claim 2 in which the bonded metal material has a shearing strength of 52.3 kg/cm$^2$ or higher, a tear-off strength of 10.1 kg/cm$^2$ or higher wherein the insulating paint film containing glass flakes therein has a specific resistance of $1 \sim 3 \times 10^{14}$ Ω-cm at an applied voltage of $500 \sim 700$ μm.

* * * * *